United States Patent [19]

Hansson et al.

[11] 4,145,111
[45] Mar. 20, 1979

[54] LASER BEAM REFLECTOR ASSEMBLY ADAPTED FOR EXTERNAL ATTACHMENT TO TARGET AIRCRAFT

[75] Inventors: Hans Hansson; Krister Karling, both of Linköping, Sweden

[73] Assignee: Saab-Scania Aktiebolag, Linköping, Sweden

[21] Appl. No.: 835,639

[22] Filed: Sep. 22, 1977

[30] Foreign Application Priority Data

Oct. 4, 1976 [SE] Sweden ............................. 7610948

[51] Int. Cl.² ............................................ G02B 5/12
[52] U.S. Cl. ........................................ 350/97; 35/25; 244/137 R
[58] Field of Search .................. 350/97, 287, 293, 31; 35/25; 356/12; 244/2, 3.12, 14, 110 G, 122 AD, 123, 137 R, 121 TD; 89/1.8, 1.7, 127, 36 A, 36 C, 362, 375 R, 41 E, 41 L; 273/101.1; 32/25; 343/5 DR

[56] References Cited

U.S. PATENT DOCUMENTS

| | | | |
|---|---|---|---|
| 2,489,337 | 11/1949 | Sperling | 244/31 |
| 2,813,719 | 11/1957 | Hopper | 244/1 TD |
| 3,268,188 | 8/1966 | La Roe et al. | 244/137 R |
| 3,468,501 | 9/1969 | Baum | 244/137 R |
| 3,820,872 | 6/1974 | Lenfont | 350/287 |
| 3,898,747 | 8/1975 | Marshall | 35/25 |
| 3,905,680 | 9/1975 | Nagel | 350/97 |
| 3,955,292 | 5/1976 | Robertsson | 35/25 |
| 3,995,376 | 12/1976 | Kimble | 35/25 |

FOREIGN PATENT DOCUMENTS 3214 of 1911 United Kingdom ..................... 350/97

Primary Examiner—John K. Corbin
Assistant Examiner—B. W. de los Reyes
Attorney, Agent, or Firm—Ira Milton Jones

[57] ABSTRACT

An aircraft-carried omnidirectional assembly of retroreflectors for reciprocal-direction reflection of laser beams comprises an aerodynamically slender body having fittings on its medial portion for attachment to underwing supports for externally carried loads. Recessed in each end portion of the body are a plurality of individual retroreflectors, one coaxial and facing endwise outwardly, the rest spaced lengthwise from it and one another and facing in different generally lateral directions but with their axes intersecting the longitudinal axis of the body and uniformly inclined towards the adjacent body extremity. The incident sectors of the several retroreflectors at each end of the body slightly overlap and complement one another to provide, collectively, a hemispherical incident sector symmetrical to the body axis and complementary to the collective hemispherical incident sector of the retroreflectors at the other end portion of the body.

5 Claims, 4 Drawing Figures

LASER BEAM REFLECTOR ASSEMBLY ADAPTED FOR EXTERNAL ATTACHMENT TO TARGET AIRCRAFT

Priority is claimed for this application on the basis of Swedish Patent Application No. 7610948-7, filed Oct. 4, 1976.

This invention relates to equipment for use in gunnery target practice wherein the firing of projectiles towards a target is simulated by laser beams that are directed in accordance with the aiming of a weapon from which the simulated firing takes place; and the invention is more particularly concerned with an improved assembly of retroreflectors for external mounting on an aircraft flown as a target for such gunnery practice, whereby a laser beam arriving at the target from any direction is reflected in an exactly opposite direction, back to its source.

One type of apparatus that uses laser beam emissions to simulate firing of projectiles for gunnery practice is disclosed in U.S. Pat. No. 3,955,292, to H. R. Robertsson. With the apparatus of that patent, the results obtained with each simulated round or burst are available at the weapon position immediately after the simulated firing has occurred, because the target carries reflector means of a type that reflects a received laser beam in the direction exactly opposite to the one from which it arrived at the target. Thus, if a gun crew has aimed its gun correctly, the laser beam emitted from that weapon will be reflected back from the target to the weapon position, where a suitable detector will respond to the reflected beam to cause a hit to be signaled. If the weapon has not been properly aimed, the laser beam will of course pass to one side of the target; and since there will be no reflection back to the detection and scoring apparatus at the weapon, a miss will be signalled to the gun crew.

Gunnery practice is especially effective when the gun crew can receive information about the results of each round or burst immediately after the firing has occurred, so that the crew can at once correct its errors and reinforce its successful performance habits. Accordingly, laser beam target practice equipment that comprises reflector means on a target aircraft and a detector of reflected beams at the weapon position is particularly valuable for training in anti-aircraft gunnery, which demands the highest degree of gunnery skill. Heretofore, however, there has not been a reflector means capable of use in connection with such equipment that was satisfactory for target aircraft.

A retroreflector is a known device by which an incident light beam can be reflected back in a direction exactly opposite to the direction from which it arrived at the retroreflector. An individual retroreflector comprises prisms or mirrors having plane reflecting surfaces arranged in opposite pairs, the reflecting surfaces of each pair being perpendicular to one another and disposed at opposite sides of an axis of symmetry to which they are inclined at equal acute angles and which can be regarded as the retroreflector axis. The reflectors are mounted in a cup-shaped housing that opens in a forward direction and has a coaxial cylindrical exterior.

An individual retroreflector is effective only for beams that come to it from within a more or less cone shaped sector that has its apex at the retroreflector and is symmetrical to its axis. Typically, this sector of effectiveness or incident sector — which can be regarded as the field of view of the retroreflector — has about a 65° angle of divergence as measured transversely through the retroreflector axis.

Obviously a target aircraft could be in any of innumerable different attitudes at the instant a laser beam is directed towards it, and a laser beam arriving at the aircraft should be reflected back to its source regardless of the attitude of the aircraft. This is to say that the reflector means carried by a target aircraft should be capable of reciprocal-direction reflection of beams reaching the aircraft from any direction relative to it. It is evident that a single retroreflector cannot afford such omnidirectional effectiveness, and therefore a target aircraft must carry a plurality of retroreflectors, all having their axes oriented in different directions.

If a large number of retroreflectors were mounted externally on the skin of an aircraft, at various locations around it, they would produce an objectionable amount of drag. Recessing the retroreflectors to minimize their drag would tend to impair the structural strength of the airframe and would entail major modification of it. Whether projecting from the skin or recessed into it, each retroreflector would have to have its axis in exactly a predetermined relationship to the axes of the aircraft, to ensure omnidirectional effectiveness; hence attachment of the individual retroreflectors to the aircraft would be laborious and expensive. An aircraft so equipped would not be readily convertible from target practice flying to other types of operations and would be very expensive in relation to its limited utility.

It has been proposed that the reflector means for a target aircraft be arranged as a generally spherical cluster of individual retroreflectors, all facing outwardly from a common center at which their axes intersect. This assembly would be detachably connected to the aircraft structure by means of a supporting rod or the like projecting radially from the cluster.

Such a retroreflector cluster, although undoubtedly possessing the necessary omnidirectional capability, would not be suitable for mounting on the exterior of an aircraft. If comprised of individual retroreflectors having an ordinary size, the diameter of the sphere circumscribing the cluster would be about 200 mm. (about 8 inches). Mounted externally on an aircraft, with its supporting rod extending forwardly on the aircraft structure, a sphere of that size would generate a great deal of drag and could very well impair the stability of the aircraft. Furthermore, some part of the aircraft would inevitably blank out a portion of the field of view of a single such cluster, making two of them necessary for complete coverage and consequently doubling the excessive drag due to one. Because the particular location of the cluster on an aircraft might be critical with respect to stability, such an assembly could not be readily transferred from one type of aircraft to another unless each such aircraft type had been extensively test flown with the assembly mounted thereon, to determine the most satisfactory location for the assembly on the particular aircraft type and to confirm that stability and controllability were not adversely affected.

By contrast, the general object of the present invention is to provide an omnidirectional retroreflector assembly that can be quickly and readily detachably mounted on an aircraft to enable it to serve as a target for anti-aircraft gunnery training in which laser beam emissions are employed to simulate projectiles, which retroreflector assembly will not cause any greater drag or effect upon stability or controllability than the external loads which the aircraft is designed to carry.

Another and more specific object of the invention is to provide an omnidirectional retroreflector assembly that can be attached to aircraft structure designed for carrying external loads such as bombs and rocket missiles, to enable a combat aircraft to be quickly and easily converted for service as a target for anti-aircraft gunnery practice with laser equipment of the above described type, and which retroreflector assembly is of such aerodynamic configuration that performance of an aircraft on which it is installed will be in all respects substantially similar to the performance of the same aircraft when carrying combat stores as external loads.

Another specific object of this invention is to provide an omnidirectional retroreflector assembly of the character described comprising individual retroreflectors which are not exposed to direct wind attack and which are protected against erosion by rain and hail.

It is also a specific object of this invention to provide a retroreflector assembly of the character described that is well adapted for attachment to the wings of a target aircraft and which is so arranged and so mounted on the aircraft that the omnidirectional effectiveness of the assembly is not affected by the wings of the aircraft in any attitude thereof.

With these observations and objectives in mind, the manner in which the invention achieves its purpose will be appreciated from the following description and the accompanying drawings which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof and in which.

Figure 1:
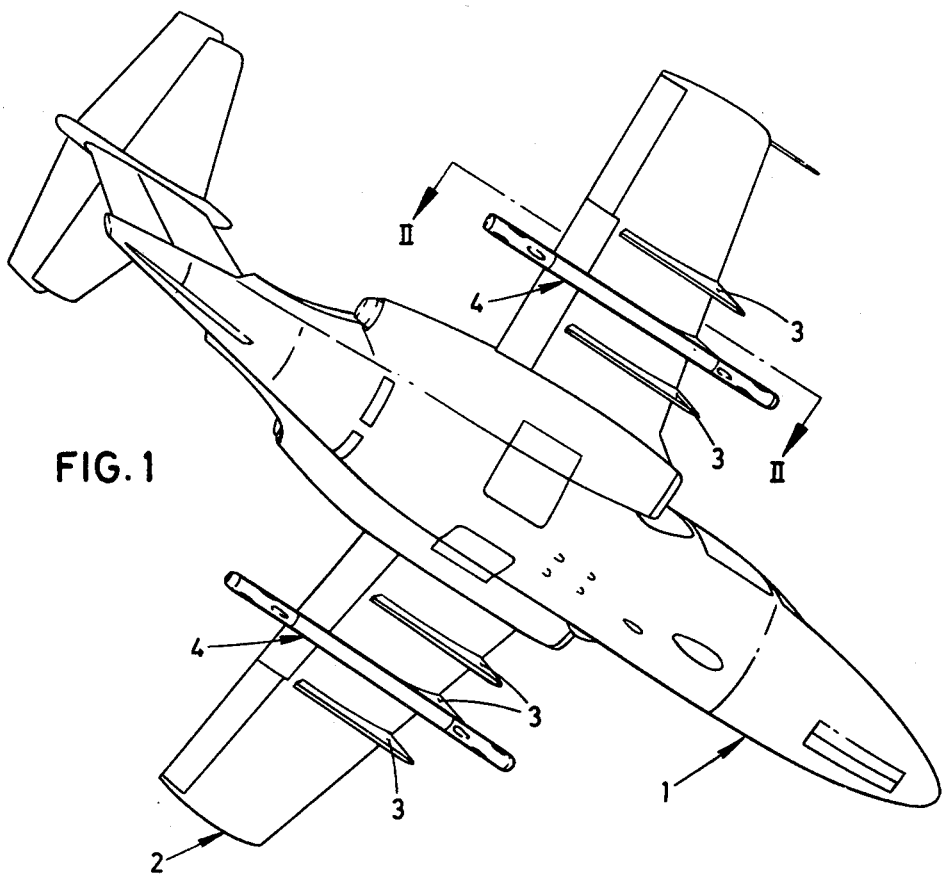
FIG. 1 is a perspective view of an aircraft having an omnidirectional retroreflector assembly of this invention mounted beneath each of its wings, the aircraft being seen from obliquely below the same.

Referring now to the accompanying drawings, the numeral 1 designated an aircraft having wings 2 that are provided at their undersides with attachment beams 3 for supporting combat stores such as bombs or rocket missiles that are to be externally carried by the aircraft. As illustrated, however, the aircraft 1 is equipped to be flown as a target for gunnery practice wherein laser beam emissions are used to simulate projectiles fired from each weapon, and for that purpose one of the three attachment beams 3 under each wing has secured to it an omnidirectional retroreflector assembly 4 that embodies the principles of this invention. Each of the assemblies 4, upon receiving a laser beam that comes to it from any direction, reflects that beam back in a reciprocal direction, that is, a direction exactly opposite to the one from which the beam arrived.

Each assembly 4 comprises an elongated medial body portion 5 and a pair of end body portions 8 which are at opposite ends of the medial body portion 5 and which cooperate with it to comprise an aerodynamically slender body. A plurality of individual retroreflectors 10–16 are mounted in each of the end body portions 8, in an arrangement described hereinafter. Preferably the end portions 8 and the medial body portion 5 are cylindrical and of like diameter, as well as coaxial, so that the body as a whole is rod-like; but the body can have any other elongated form that is favorable to low aerodynamic drag. As the description proceeds it will be apparent that with retroreflectors of conventional size, the diameter of the rod-like body can be less than 120 mm. (less than about 4.75 inches), and therefore the retroreflector assembly 4 of this invention can in most cases be accommodated within the envelope of a conventional airborne missile or rocket.

Two suspension fittings 6 and 7 on the medial body portion 5 enable it to be quickly and readily detachably secured to conventional external load supporting means on the attachment beams 3. The assembly 4 is of course secured to the aircraft with the longitudinal axis 20 of the body aligned with the normal flight direction of the aircraft, for minimum drag.

Figure 2:
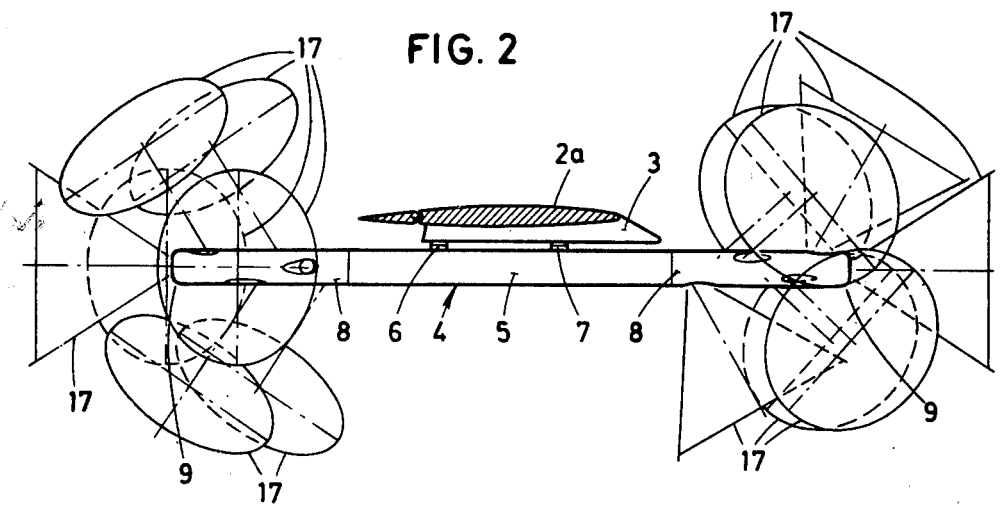
FIG. 2 is a side view of one of the retroreflector assemblies shown in FIG. 1, in its relation to an attachment beam on the wing of the aircraft, the wing being shown in cross-section on the plane of the line II—II in FIG. 1.
Figure 3:
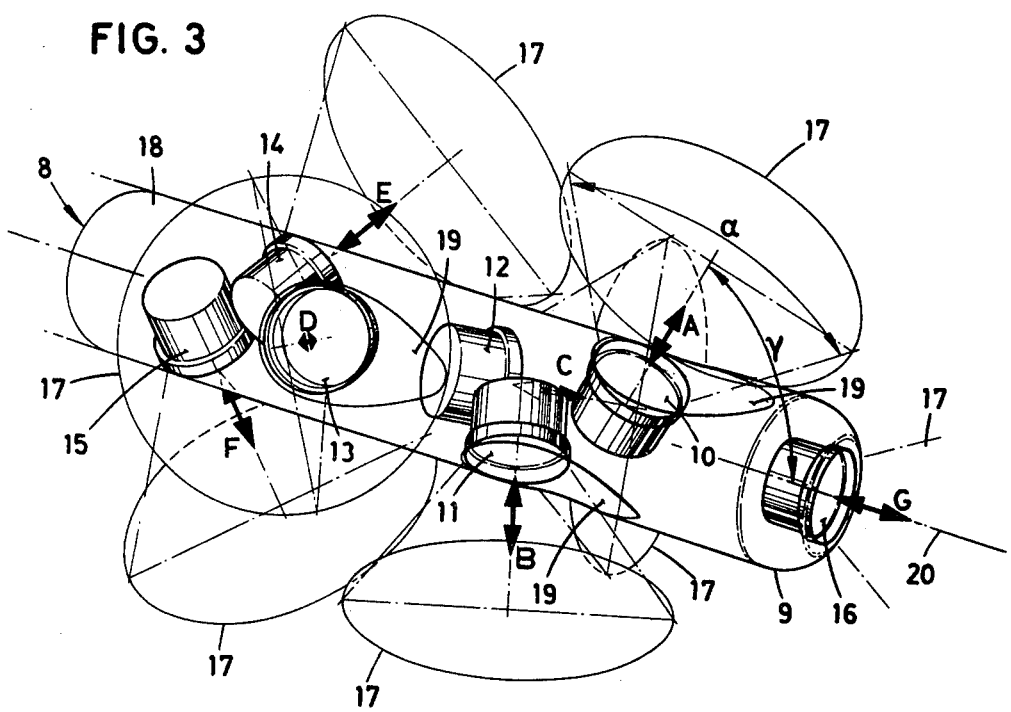
FIG. 3 is a side perspective view of one end portion of an aerodynamic body and individual retroreflectors that cooperate therewith to comprise the assembly of this invention, the body being shown in phantom to enable the arrangement and disposition of the individual retroreflectors to be seen in their relationship to the body and to one another.

The medial body portion 5 has a length which is at least equal to the local wing chord 2a; or if the attachment beam 3 extends beyond the wing chord, as shown in FIGS. 1 and 2, then the length of the medial body portion 5 is at least equal to the wing chord plus the length of the portion or portions of the attachment beam 3 that project beyond the wing. Preferably the body end portions 8 are readily detachably securable to the medial portion 5, so that end portions 8 can be interchanged with medial body portions 5 of different lengths that adapt the assembly for use with aircraft of different types and assure that in every installation both end portions 8 of each assembly 4 will project endwise beyond parts of the aircraft structure that are laterally adjacent to the body. The connections between the end body portions 8 and the medial body portion 5 are conventional, as are the securement devices by which the medial body portion is carried from the attachment beam 3, and therefore those details are not illustrated.

The end body portions 8 can be of identical construction. Each is slightly rounded at its extremity, as designated by 9, to minimize drag of the body as a whole. Each of the end body portions 8 carries a plurality of individual retroreflectors 10–16 that can be of conventional construction and identical with one another.

One of the individual retroreflectors, designated by 16, is installed in the outer end of each end body portion 8, facing endwise outwardly with its axis G substantially coinciding with the axis 20 of the body. Preferably each endwise facing retroreflector 16 is protected by a glass cover which prevents erosion of its reflecting surfaces by rain, hail and dust and also minimizes turbulence at its end of the assembly.

The remaining retroreflectors 10–15 in each end body portion comprise a group, in which the individual retroreflectors face generally in laterally outward directions and are spaced from one another and from the concentric one 16 along the length of the end portion. Each of the laterally facing retroreflectors 10–15 is so recessed within the end body portion 8 that it does not project beyond the cylindrical surface thereof, but because of the lengthwise spacing of the several retroreflectors, the diameter of the body need not be substantially greater than the maximum dimension across one retroreflector, assuring the low aerodynamic drag that is one of the objects of this invention.

The several retroreflectors 10–16 in each end body portion are so arranged that, together, their incident sector or sector of effectiveness is hemispherical and symmetrical to the body axis; and of course the hemispherical incident sectors of the two end portions are complementary to one another so that the assembly 4 as a whole has the desired omnidirectional character. To that end, the several retroreflectors 10–15 of the laterally outwardly facing group are so arranged that the axis of each intersects the longitudinal axis 20 of the body, but their axes extend in different radial directions from the body axis 20, with uniform circumferential angles between their axes as measured around the axis of the body. Furthermore, the axis of every retroreflector 10–15 in the laterally outwardly facing group is inclined towards the adjacent extremity of the body, all of those axes being at like oblique angles to the body axis 20.

Figure 4:
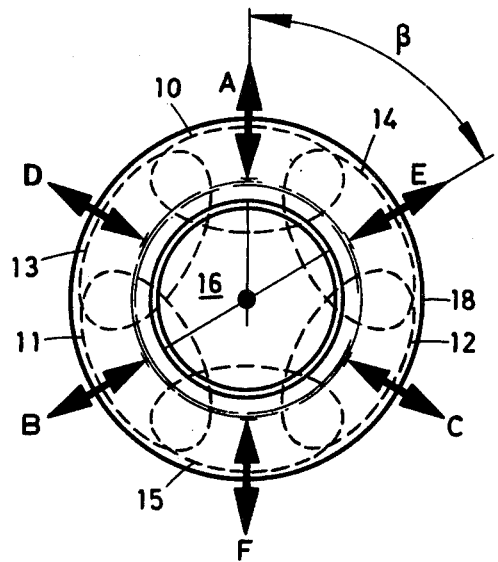
FIG. 4 is an end view of the assembly.

If the incident sector 17 of an individual retroreflector is encompassed by an angle $\alpha$ of 65°, as is generally conventional, then each of the retroreflectors 10–15 of the laterally facing group has its axis A–F, respectively, at an angle $\gamma$ of 60° to the body axis, so that the incident sector of every laterally facing retroreflector slightly overlaps the incident sector of the endwise facing retroreflector 16. There are six retroreflectors 10–15 in the laterally outwardly facing group, and they face in different radial directions such that their axes A–F diverge at uniform circumferential angles $\beta$ of 60°, as best seen in FIG. 4. Consequently, the 65° incident sector 17 of each of them is overlapped slightly by those of two others of the group as well as by that of the endwise facing retroreflector 16.

Actually, the incident sector of the collective retroreflectors 10–16 in each end body portion is slightly more than a hemisphere and thus slightly overlaps the substantially hemispherical zone of effectiveness of the cooperating retroreflectors in the opposite end portion of the body, assuring that there will be no gaps in the omnidirectional effectiveness of the assembly.

Each of the laterally facing retroreflectors 10–15 is so recessed within the end body portion 8 that no part of it projects beyond the cylindrical body surface 18. Therefore, at most, a small portion of the front rim of the cup-shaped housing of the retroreflector is flush with the cylindrical surface 18 of the body, and, owing to the endwise inclination $\gamma$ of its axis, all of the remainder of the retroreflector is inside that surface. To accommodate this inclination $\gamma$ of the axis of the retroreflector and the divergence $\alpha$ of its incident sector, the cylindrical recess in which the retroreflector is received can open outwardly to a more or less teardrop shaped cavity 19 at the surface of the body, surrounding the rim of the retroreflector housing and extending substantially axially towards the adjacent body extremity from the portion of the rim that is deepest in the body. The cavity 19 is so formed that no portion of its surface comes within the incident sector of the retroreflector in it, and therefore the retroreflector can receive and reflect even those beams that pass near the adjacent extremity of the body and approach the retroreflector tangentially to its incident sector along the side thereof nearest said extremity. Preferably the edges of the cavities 19 are gently rounded at their junctions with the cylindrical surface 18 of the body, to minimize drag.

Theoretically, there may seem to be a dead zone between the hemispherical incident sectors of the two body end portions 8, owing to their separation by the length of the medial body portion 5; but this dead zone exists only within very limited distances from the aircraft, owing to the fact that the incident sector of the collective retroreflectors in each end body portion is slightly more than a hemisphere, and the zones of effectiveness of the two end body portions therefore merge into one another at a distance from the assembly 4 which is very short compared to ordinary shooting distances. To further ensure that there will be no dead zones, the end body members 8 are so oriented rotationally with respect to one another that the laterally facing retroreflectors 10–15 of each have their axes at angles of $\frac{1}{2}\beta$, or 30°, to those of the other.

Because each end body portion projects beyond laterally adjacent aircraft structure including the attachment beams 3, the hemispherical incident sectors of the collective retroreflectors 10–16 in each end body portion are not limited by the structure at the leading and trailing edges of the wings. Furthermore, because of the low drag of each assembly 4, two such assemblies can be carried by an aircraft, one under each wing, without any detrimental effect upon its performance; and if a laser beam is blocked from either of the assemblies 4 by the fuselage or some other part of the aircraft, the other assembly will nevertheless receive and reflect the beam.

It will be apparent that the retroreflector assembly of the present invention is well adapted for readily detachable installation on various combat aircraft, to convert them for use as target aircraft in gunnery practice wherein firing is simulated by means of laser emissions directed in accordance with weapon aiming, and that the assembly does not substantially impair the performance of an aircraft on which it is installed but nevertheless provides for omnidirectional reciprocal-direction reflection of laser beams to enable accurate scoring of weapon fire results irrespective of the position or attitude of the target aircraft at the time firing occurs.

Those skilled in the art will appreciate that the invention can be embodied in forms other than as herein disclosed for purposes of illustration.

The invention is defined by the following claims:

We claim:

1. An assembly by which an aircraft designed for other missions can be readily adapted to serve as a target for gunnery practice wherein firing of projectiles is simulated by emission of laser beams directed in accordance with aiming of a weapon from which the firing is assumed to occur, said assembly comprising a plurality of substantially identical retroreflectors, each of which has an axis and is capable of reciprocal direction reflection of only those beams reaching the reflector from sources within a limited substantially conical incident sector that has its apex at the retroreflector and is symmetrical to the retroreflector axis, but said assembly nevertheless enabling a laser beam arriving at the aircraft from substantially any direction to be reflected in the reciprocal direction so that the reflection of the laser beam can be detected at its source, and said assembly being detachably securable to the aircraft and having substantially the same effect upon the performance of the aircraft as an external load which the aircraft is designed to carry, said assembly being characterized by:

A. an elongated aerodynamically slender carrying body
  (1) having a longitudinal axis and
  (2) having means thereon by which said body can be supported on an aircraft, at the exterior thereof, with said longitudinal axis substantially aligned with a normal flight direction of the aircraft;
B. one of said retroreflectors being located at each extremity of said body, each of said retroreflectors at a body extremity
  (1) facing lengthwise outwardly from the body; and
  (2) having its axis in substantial coincidence with said longitudinal axis; and
C. the remainder of said plurality of retroreflectors being arranged on the body in two groups, one group at each end portion of the body,
  (1) each retroreflector of each group being in a laterally opening recess in the body to be wholly within the limits of the body surface,
  (2) the retroreflectors in each of said groups being spaced along the body from one another and from the retroreflector at the adjacent extremity of the body so that the thickness of the body need not be substantially greater than a maximum dimension of a retroreflector, and
  (3) the several retroreflectors in each group having their respective axes
    (a) substantially radial to said longitudinal axis,
    (b) all inclined towards the adjacent extremity of the body at substantially like oblique angles to said longitudinal axis, and
    (c) extending from said longitudinal axis in different directions such that the incident sectors of the several retroreflectors at each end portion of the body are complementary to one another and are collectively complementary to the collective incident sectors of the retroreflectors at the other end portion of the body.

2. The assembly of claim 1 wherein said body has a medial portion intermediate its end portions, and wherein said medial portion of the body has said means thereon for supporting the body on an aircraft, further characterized by:
D. each of said end portions of the body being detachably securable to said medial portion thereof, so that body end portions can interchangeably cooperate with different medial body portions; and
E. said medial body portion being of such length that when the same is supported on an aircraft, each of said end portions of the body is disposed endwise outwardly of laterally adjacent portions of the aircraft structure.

3. The assembly of claim 1, further characterized by:
D. the axes of the retroreflectors comprising each of said groups being divergent from one another at uniform angles around said longitudinal axis, so that the retroreflectors at each end portion of the body cooperate with one another for reciprocal-direction reflection of incident light from sources anywhere within a hemispherical sector that is symmetrical to the longitudinal axis and complementary to the hemispherical sector for which the retroreflectors at the other end portion of the body are collectively effective.

4. The assembly of claim 3, further characterized by: the axes of the respective retroreflectors of one group being also divergent from those of the respective retroreflectors of the other group, and there being uniform angles of divergence between the axes of the several retroreflectors.

5. An assembly by which an aircraft designed for other missions can be readily adapted to serve as a target for gunnery practice wherein firing of projectiles is simulated by emission of laser beams directed in accordance with aiming of a weapon from which the firing is assumed to occur, said assembly comprising a plurality of substantially identical retroreflectors, each of which has an axis and is capable of reciprocal direction reflection of only those beams reaching the reflector from sources within a limited substantially conical incident sector that has its apex at the retroreflector and is symmetrical to the retroreflector axis, but said assembly nevertheless enabling a laser beam arriving at the aircraft from substantially any direction to be reflected in the reciprocal direction so that the reflection of the laser beam can be detected at its source, and said assembly being detachably securable to the aircraft and having substantially the same effect upon the performance of the aircraft as an external load which the aircraft is designed to carry, said assembly being characterized by:
A. an elongated aerodynamically slender body
  (1) having a longitudinal axis,
  (2) having a medial portion and opposite coaxial end portions and
  (3) having means on its medial portion by which the body can be externally supported on an aircraft with its longitudinal axis substantially aligned with a normal flight direction of the aircraft;
B. there being a set of retroreflectors at each end portion of the body, with the retroreflectors of each set spaced along the body from one another,
  (1) one retroreflector of each of said sets of retroreflectors being at the extremity of its end portion of the body, coaxial therewith and facing lengthwise outwardly,
  (2) each of the other retroreflectors of each set thereof being wholly within the confines of the longitudinally extending surface of the end body portion and facing in an outward generally lateral direction through a cavity in said surface, and
  (3) said other retroreflectors of each set thereof having their respective axes divergent from one another and from said longitudinal axis at oblique angles such that the incident sectors of the set of retroreflectors at each body end portion are complementary to one another and cooperate to provide a substantially large collective incident sector that is complementary to the collective incident sector of the set of retroreflectors at the other body end portion.

* * * * *